(12) United States Patent
Huggett

(10) Patent No.: US 8,406,304 B2
(45) Date of Patent: Mar. 26, 2013

(54) MOTION ESTIMATOR

(75) Inventor: Anthony Richard Huggett, Eastleigh (GB)

(73) Assignee: Ericsson AB, Stockholm (SE)

( * ) Notice: Subject to any disclaimer, the term of this patent is extended or adjusted under 35 U.S.C. 154(b) by 1443 days.

(21) Appl. No.: 11/811,230

(22) Filed: Jun. 8, 2007

(65) Prior Publication Data

US 2008/0043844 A1 Feb. 21, 2008

(30) Foreign Application Priority Data

Jun. 12, 2006 (GB) .................................. 0611568.7

(51) Int. Cl.
*H04N 7/12* (2006.01)

(52) U.S. Cl. ................... 375/240.16; 382/236; 382/239; 382/243; 348/699

(58) Field of Classification Search .................... None
See application file for complete search history.

(56) References Cited

U.S. PATENT DOCUMENTS

| 5,030,953 | A | | 7/1991 | Chiang | |
|---|---|---|---|---|---|
| 5,778,188 | A | * | 7/1998 | Taniguchi et al. | 709/236 |
| 5,973,742 | A | * | 10/1999 | Gardyne et al. | 375/240.15 |
| 6,205,177 | B1 | * | 3/2001 | Girod et al. | 375/240.14 |
| 6,366,616 | B1 | | 4/2002 | Mizuno et al. | |
| 6,381,279 | B1 | * | 4/2002 | Taubman | 375/240.18 |
| 6,560,284 | B1 | | 5/2003 | Girod | |
| 6,687,303 | B1 | * | 2/2004 | Ishihara | 375/240.21 |
| 6,901,110 | B1 | * | 5/2005 | Tsougarakis et al. | 375/240.12 |
| 7,601,616 | B2 | * | 10/2009 | Morikazu et al. | 438/463 |
| 2004/0057626 | A1 | * | 3/2004 | Acharya et al. | 382/236 |

OTHER PUBLICATIONS

Kuhn P M: "Fast MPEG-4 Motion Estimation: Processor Based and Flexible VLSI Implementation" Journal of VLSI Signal Processing Systems for Signal, Image, and Video Technology, Springer, New York, NY, US, vol. 23, No. 1, Oct. 1, 1999, XP000862772, ISSN: 0922-5773.

JVT: "Draft ITU-T Recommendation and Final Draft International Standard of Joint Video Specification (ITU-T Rec. H.264 ISOIIEC 14496-10 AVC)" Video Standards and Drafts, No. JVT-G050r1, Mar. 14, 2003, XP030005712.

* cited by examiner

*Primary Examiner* — Christian LaForgia
*Assistant Examiner* — Brian Olion

(57) ABSTRACT

A motion estimator includes a shape, address and vector generator to produce control signals according to a selected size and shape of a search area comprising scan lines. A variable delay reads reference image data of a frame in which a matching macroblock is sought from a store under control of a variable delay control signal from the signal generator to align a current serial input stream of a current scan line with a serial input stream of an immediately preceding scan line. The aligned reference image pixel data is matched against pixel data of a current macroblock using a vector from the signal generator to produce a score representing a quality of the match. A best score together with the corresponding best vector is recorded and the best vector output.

26 Claims, 3 Drawing Sheets

MOTION ESTIMATOR

FIELD OF THE INVENTION

This invention relates to a motion estimator and in particular to a motion estimator with arbitrary search window shape for a digital image coding system and more particularly relates to a motion estimator for the generation of motion vectors.

BACKGROUND OF THE INVENTION

Known practice in motion estimation, ME, which is also specified in standard image coding systems such as MPEG2 and H264, is to estimate motion vectors for some macroblocks. A macroblock is a defined two-dimensional array of contiguous pixels selected from a current picture of a video sequence, aligned with a macroblock grid. A size and shape of the macroblock is usually specified in a relevant standard.

A transmitted motion vector for a current macroblock is a representation of a 2-dimensional shift which would be required to move a current macroblock to a position of a best match in a search area of a reference picture. The motion vector is used in a decoder to locate pixels from a previously received picture which provide the best match for the array of pixels in a macroblock to be decoded.

This match is performed at the encoder by searching in one or more chosen reference pictures nearby in the video sequence, typically within 10 frames, that have previously been encoded.

Since an order of encoding and transmission may be different from a display order of pictures, it is possible, and often useful, to predict macroblocks by transmitting motion vectors from previously encoded reference pictures that will not be displayed until after the current frame is displayed.

The motion estimation process described above is a computationally intensive task. It is important, therefore, to concentrate the search for the motion vector on an area of the reference image in which the best match is most likely to be found. Prior art is to use fixed rectangular search areas because they are convenient to process but they can waste valuable resources and time in searching areas where the best match vector is unlikely to be found. Moreover, statistics show that a best shape of this search area is not conveniently rectangular; strong diagonal motion, represented by the corners of a rectangular search window, is very rare in actual picture sequences.

It is an object of the present invention at least to ameliorate the aforesaid shortcomings in the prior art.

SUMMARY OF THE INVENTION

According to a first aspect of the present invention there is provided a motion estimator comprising: shape, address and vector generation means arranged to generate control signals according to a selected size and shape of a search area comprising scan lines; reference image store means arranged to store a frame in which a matching macroblock is sought; variable delay line means arranged to read data from the reference image store means, under variable delay control from the shape, address and vector generation means, to align a current serial input stream of a current scan line with a serial input stream of an immediately preceding scan line, to produce aligned reference image pixel data; match computation means arranged to receive the aligned reference image pixel data and pixel data of a current macroblock for which a match is sought and a vector from the shape, address and vector generation means to produce a score representing a quality of a match between the aligned reference image data and pixels of a current macroblock defined by the received vector; and optimisation means arranged to record a best score together with the corresponding best vector and to output the corresponding best vector.

Preferably, the shape, address and vector generation means is adapted to generate control information which is variable from picture to picture according to image behaviour to optimise search area shape and size dependent on image criteria.

Conveniently, the motion estimator further comprises weighting means arranged to weight luminance of the reference image so that a current macroblock is matched against a scaled version of the reference image.

Advantageously, the match computation means is arranged to match the reference image data and macroblock data using one of a sum of absolute differences and normalised cross-correlation.

Advantageously the motion estimator further comprises costing means arranged to weight a score produced by the match computation means dependent on the corresponding vector.

Conveniently, the costing means is arranged to weight the score dependent upon at least one of image properties local to the search area and previous coding history.

Advantageously, the shape, address and vector generation means is arranged to generate a validity control signal for input to the optimisation means to instruct the optimisation means to examine matches only within valid search areas.

Advantageously, the variable delay line means further comprises extend image means to allow searching by the match computation means for vectors which originate outside a picture being searched by switching all outputs of the variable delay line means directly to the input of the variable delay line means on assertion of an extend image line signal for a first scan line of a search area.

According to a second aspect of the invention, there is provided a method of generating a motion vector for a digital image coding system comprising: generating shape, address, vector and variable delay control signals according to a selected size and shape of a search area comprising scan lines; storing a reference image of a frame in which a matching macroblock is sought; variably delaying data read from the reference image, according to the variable delay control signal to align a current serial input stream of a current scan line of the search area with a serial input stream of an immediately preceding scan line, to produce aligned reference image pixel data; receiving the aligned reference image pixel data and pixel data of a current macroblock for which a match is sought and a vector control signal at match computation means and producing a score representative of a quality of a match between the aligned reference image data pixels and pixels of a current macroblock defined by the received vector control signal; and recording a best score together with the corresponding best vector and outputting the corresponding best vector.

Preferably, the control information generated is variable from picture to picture according to image behaviour to optimise search area shape and size dependent on image criteria.

Conveniently, the method further comprises weighting luminance of the reference image so that a current macroblock is matched against a scaled version of the reference image.

Conveniently, the method comprises matching the reference image data and macroblock data using one of a sum of absolute differences and normalised cross-correlation.

Preferably, the method comprises matching the reference image data and macroblock data every clock cycle.

Advantageously, the method further comprises weighting a score produced by matching the reference image data and macroblock data dependent on the corresponding vector.

Conveniently, the method comprises weighting the score dependent upon at least one of image properties local to the search area and previous coding history.

Advantageously, the method further comprises generating a validity control signal to restrict examining matches to valid search areas.

Conveniently, variably delaying data read from the reference image further comprises providing extend image means to permit searching by the match computation means for vectors which originate outside a picture being searched by switching all outputs of the variable delay line means directly to the input of the variable delay line means on assertion of an extend image line signal for a first scan line of a search area.

According to a third aspect of the invention, there is provided a computer readable medium comprising computer executable software code stored therein, the code being for generating a motion vector for a digital image coding system comprising: generating shape, address, vector and variable delay control signals according to a selected size and shape of a search area comprising scan lines; storing a reference image of a frame in which a matching macroblock is sought; variably delaying data read from the reference image, according to the variable delay control signal to align a current serial input stream of a current scan line of the search area with a serial input stream of an immediately preceding scan line, to produce aligned reference image pixel data; receiving the aligned reference image pixel data and pixel data of a current macroblock for which a match is sought and a vector control signal at match computation means and producing a score representative of a quality of a match between the aligned reference image data pixels and pixels of a current macroblock defined by the received vector control signal; and recording a best score together with the corresponding best vector and outputting the corresponding best vector.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the accompanying drawings, in which.

DETAILED DESCRIPTION OF PREFERRED EMBODIMENTS

Figure 1:
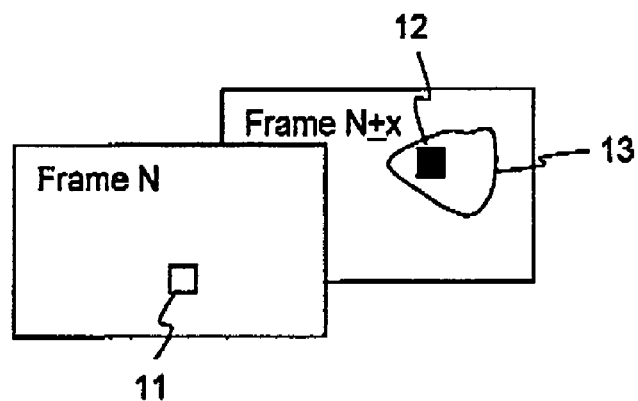
FIG. 1 is a schematic diagram of motion vector derivation according to the invention.

Throughout the description, identical reference numerals are used to identify like parts.

Referring to FIG. 1, which illustrates a simple case of locating a best match 12 for a current macroblock 11, where only one reference frame N±x is used, a frame N includes the current macroblock 11 for which the match 12 is sought in the adjacent reference frame N±x. An irregularly shaped search field 13 is defined in the frame N±x in which to conduct the search. The search area, according to this invention, has an arbitrary shape. The search for matches to the current macroblock 11 in frame N±x is carried out only over pixels contained within the search area 13, regardless of a shape of the search area 13. The use of an irregular shape for the search area 13 poses some processing challenges that require novel solutions as detailed herein below.

Figure 2:
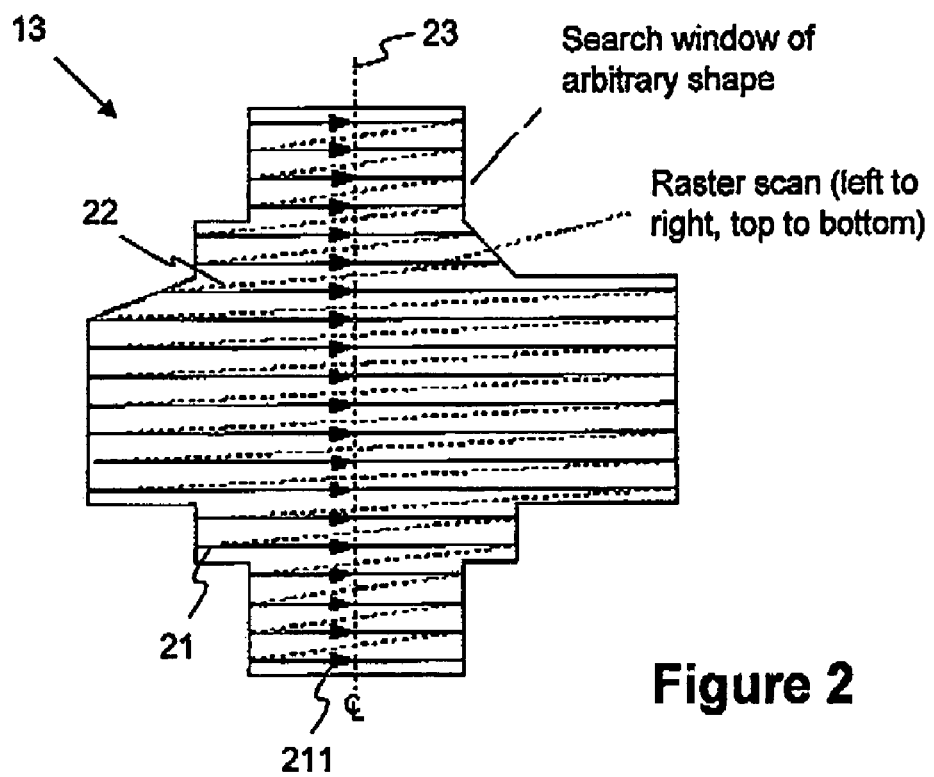
FIG. 2 is a schematic diagram of an arbitrarily shaped search window according to the invention.

FIG. 2 shows the search window 13 of arbitrary form composed of a plurality of scan lines 21 of various lengths. The arrowheads 211 indicate a left to right raster scan; the sloping, dotted fly-back lines 22 indicating that the direction of this scan is top to bottom. Scanning could equally well start with the bottom scan line and work upwards, or, slightly less efficiently, scan lines could be vertical and move from scan line to scan line left to right or right to left. There is no limit imposed on the granularity of scan line length. A left to right, top to bottom scan is assumed in the following discussion, unless otherwise stated, as in particular embodiments discussed herein below.

Figure 3:
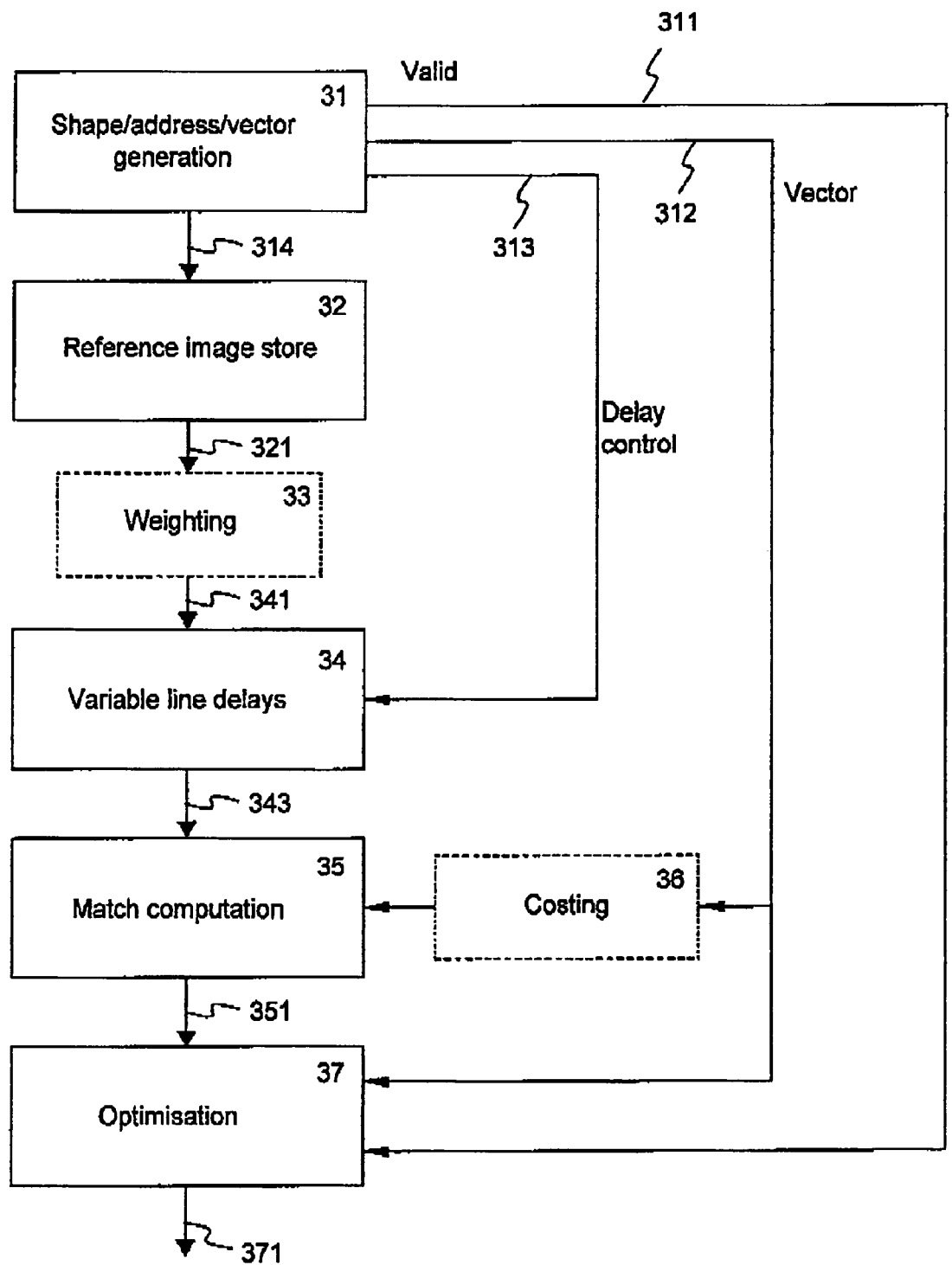
FIG. 3 is a schematic diagram of motion vector generation according to the invention.

FIG. 3 is a schematic drawing of a processing system or method according to this invention. A shape/address/vector generation module 31 produces all key control signals 311, 312, 313 needed to define a search area 13. These are as follows.

A continuous stream of addresses 314, corresponding to all the pixels in the reference picture which lie within the chosen search window. The addresses are used to read the reference picture data 321 from the reference picture store 32 and supply it to the match processor 34, 35, 36. These addresses 314 therefore define the search area 13.

Motion vectors 312 corresponding to those addresses 314 that define the shift needed from a current macroblock 11 to a current search position in a search area 13.

A valid signal accompanying each vector indicating that the vector is one to be considered as a possible candidate for a match position in the search area. At the start of each new line of each window the search is not yet valid since the later modules are still flushing out pixels from the end of the last line and filling with the new.

There is no break in the pixel stream between the end pixel of each line 21 and the first pixel of the next, even when the line lengths are being changed due to the shape of the window 13. This stream is fed to a match processor stage 35 which is also fed with the pixels of the current macroblock. This invention comprises the use of variable line delays 34 to enable the presentation of a ready supply of pixels from the search area 13 to a match processor 35 of conventional design. The invention also comprises use of a valid signal 311 to indicate to a motion vector selection process that a given vector is a valid candidate as a required motion rector.

Description of Process

The process illustrated in FIG. 3 will now be described. An address generation process 31 is responsible for producing all appropriate control signals 311, 312, 313, 314 necessary for correct operation of a motion vector selection stage. The address generation process is controlled by information, appropriate to the parameters, set by a chosen image coding system. According to this invention, the control information can be adapted from time to time, manually or automatically and picture-by-picture, according to image behaviour, so that a most appropriate search area size and shape is chosen.

Firstly, data 321 read from the reference image store 32 is passed to an array of variable line delays 34 whose purpose is appropriately to align a serial pixel stream at an input to a following macroblock match computation stage 35.

An optional weighting module 33 is illustrated which allows the stream pixel values 321 to be modified; this can be useful in order to match the current macroblock against a scaled version of the reference image, in terms of brightness, not physical dimensions. Such weighting or scaling on a macroblock level allows compensation for certain known effects in the video stream, such as fades and small area variations in brightness, such as may be caused by flashes. This weighting 33 may conveniently be carried out by placing the weighting function in the process at the position shown in FIG. 3 before the variable line delays 34.

Figure 4:
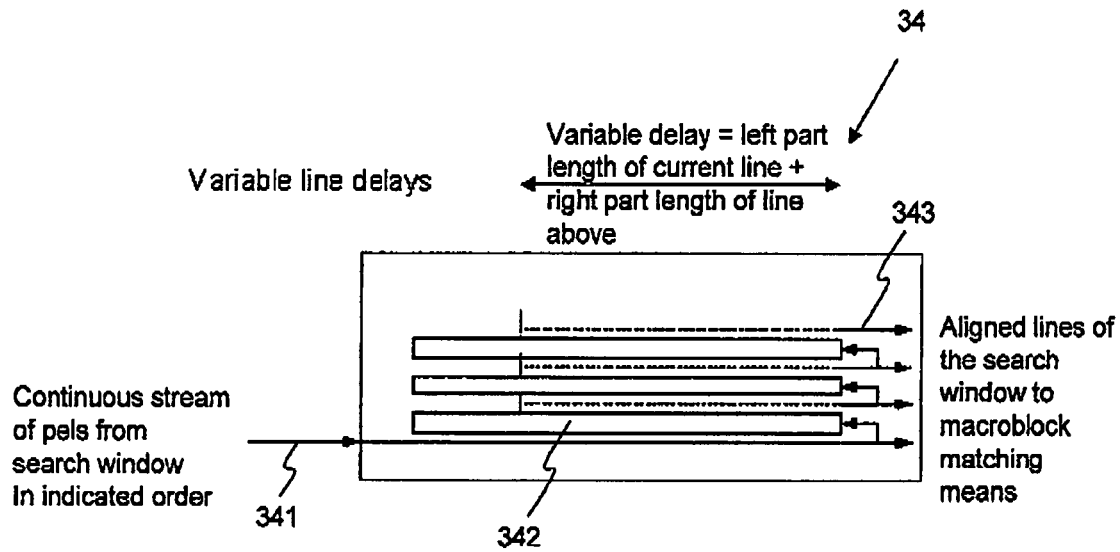
FIG. 4 is a schematic diagram illustrating use of variable delay lines to align pixels in a search area in accordance with an embodiment of the invention.

FIG. 4 illustrates the variable line delay module 34 which receives as input a serial stream of pixels 341 read from the defined search area 13 of the reference image store 32. In this example the array 34 has three lines of delay 342 shown and, hence, has four outputs 343, including a zero delay. Each line 342 in the array is set with a same delay, which may change only when each new line of the search window 13 is begun. Considering the pixels on an arbitrary centre line 23 of the shape 13 of FIG. 2, it will be understood that the delay required to preserve the vertical alignment of the pixels is the length of the current line from centre to the left hand edge, the part length of the previous line from the centre to the right hand edge. But the same delay must apply to the pixel to the left of the arbitrary centre line, and by induction to the delay for every pixel on the current line. The size of the array required is determined by the size of the macroblock being matched and this can vary according to the image coding system used. Typically in MPEG2 systems the macroblock is 16×16 pixels but in MPEG4 and H264 smaller macroblocks, which may not be square, are permitted. The result of the deployment of this array is that the several outputs 343 present to the following match computation stage 35 a parallel set of pixels in the correct vertical alignment for comparison with the current macroblock 11 for which a match is being sought. The granular adjustment of the line delays 342 ensures that the alignment can be maintained even as the search area 13 is altered.

The aligned lines from the variable line delays 34 are then passed in parallel to a match computation module 35 that is also fed with the pixels of the current macroblock 11 for which a match 12 is being sought. The match computation 35 is arranged such that it produces a score representing a quality of the match on every clock cycle throughout the search area 13. The method whereby the scoring of the match at any specific clock cycle is completed is not part of this invention and can be performed by using any one of a number of known techniques. GB 0606574.2 describes two possible methods for doing this for the Sum of Absolute Differences (SAD) method. Other methods based on other metrics e.g. normalised cross-correlation might also be used.

As illustrated, this match score may optionally be influenced by the vector 312 under consideration for this particular match by means of a costing module 36. This will allow the position of this particular match 12 in the search window 13 to weight the score, for instance, according to local image properties or the previous coding history so that, for example, false matches can be avoided.

An optimisation module 37 records a best (maximum or minimum as appropriate) candidate score 351 together with the corresponding vector 312; the vector is then output 371 to the main image system for transmission to the decoder. GB 0522084.3 describes two methods of doing this.

For macroblocks of reasonable size, typically 16 by 16, though 8×8 and 4×4 might be used in a hierarchical scheme, there will be some vectors for which the search window 13 does not wholly contain a match 12 to the source macroblock 11. This occurs where 15 full lines of data have not yet been seen, i.e. the $16^{th}$ is in progress, and 15 picture elements, i.e. pels, in this line, i.e. the $16^{th}$ pel is in progress, or where the window is getting wider and the lines above do not extend as far as the current line. In order to accommodate this situation a validity control signal 311 is produced by the shape/address/vector generation module 31. This validity control signal 311 is passed to the optimisation module 37 instructing the optimisation module 37 to examine matches only for those sets of pixels that lie within the valid search area.

According to the H264 compression standard there is provided a method for extending the reference image beyond its boundaries in order to allow the use of vectors that appear to originate from beyond the boundaries of the viewable picture. For horizontal extensions it is easy to extend the image left and right according to the specification to give a horizontally oversized picture. For vertical extension, the off-picture data is calculated differently according to whether or not a field or a frame of the reference image is being searched; it is therefore desirable to generate this off-picture information such that it is read back according to the mode of searching of the source macroblock.

Figure 5:
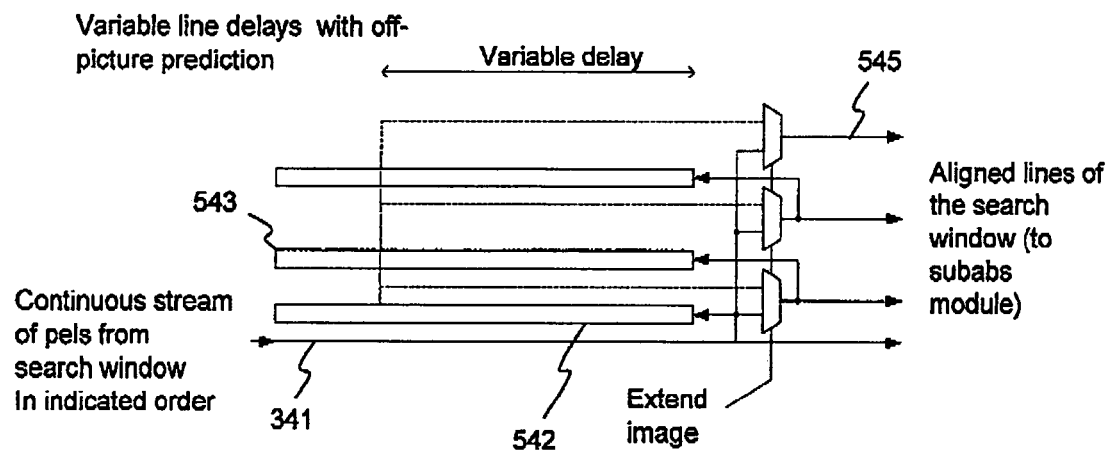
FIG. 5 is an adaptation of the schematic diagram of FIG. 4 in accordance with an embodiment of the invention for off-picture motion prediction.

A simple modification to the variable line delay array to accommodate off-picture vectors is illustrated by FIG. 5.

The 'extend image' line is asserted on the first line 542 of the search window. This causes all the outputs 545 to switch to the input pixels 341. On the second scan line 543 and subsequent scan lines the 'extend image line' is de-asserted and this causes the device to operate as in FIG. 4. With this modification the search becomes valid on the $16^{th}$ pel of the first line, rather than the $16^{th}$ line, assuming a 16×16 macroblock. This allows the performance of off-picture vertical searches in time that would otherwise be wasted in loading the variable delay lines 34 with data prior to the search becoming valid.

If the vertical direction of the raster 22 is inverted so that the search is conducted from the bottom up, the same method may be applied to search off the bottom of the reference picture instead of searching off the top. In this case changes are required either to the ordering of the source macroblock data in the match computation module 35 or further to modify the variable line delay 34 so that the lines come out in the opposite vertical sense, i.e. top line swapped with bottom, etc.

This invention therefore provides an efficient apparatus and method for deriving motion vectors over a search window 13 of arbitrary shape that is better adapted to the practical experience of motion in real image coding systems. The method of the invention allows adaptive modification of the search window 13 such that changes in image characteristics, as well as image coding history, can be used to guide a choice of window shape and size Embodiments of the present invention can be implemented as computer-readable instructions stored on a tangible computer-readable storage medium, such as a diskette, CD-ROM, ROM, or fixed disk, which, when the computer-readable instructions are executed by a processor, the computer-readable instructions execute all or part of the method described in conjunction with FIG. 3.

Although the present invention has been described with reference to preferred embodiments, workers skilled in the art will recognize that changes may be made in form and detail without departing from the spirit and scope of the invention.

I claim:

1. A motion estimator comprising:
   at least one processor;
   a non-transitory computer readable storage medium comprising computer readable instructions, when executed by the at least one processor, are configured to:
   generate control signals according to a selected size and shape of a search area comprising scan lines;
   store a frame in which a matching macroblock is sought;
   read data, using an array of variable line delays, under variable delay control to align a current serial input stream of a current scan line with a serial input stream of an immediately preceding scan line, to produce aligned reference image pixel data, wherein a size of the array required is determined by a size of a macroblock being matched;
   receive the aligned reference image pixel data and pixel data of a current macroblock for which a match is sought and a vector to produce a score representing a quality of a match between the aligned reference image data and pixels of a current macroblock defined by the received vector; and
   record a best score together with the corresponding best vector and to output the corresponding best vector.

2. A motion estimator as claimed in claim 1, wherein the computer readable instructions are further configured to generate control information which is variable from picture to picture according to image behaviour to optimise search area shape and size dependent on image criteria.

3. A motion estimator as claimed in claim 1, further wherein the computer readable instructions are further configured to weight luminance of the reference image so that a current macroblock is matched against a scaled version of the reference image.

4. A motion estimator as claimed in claim 1, wherein computer readable instructions are further configured to match the reference image data and macroblock data using one of a sum of absolute differences and normalised cross-correlation.

5. A motion estimator as claimed in claim 1, wherein the computer readable instructions are further configured to weight a score dependent on the corresponding vector.

6. A motion estimator as claimed in claim 5, wherein the computer readable instructions are further configured to weight the score dependent upon at least one of image properties local to the search area and previous coding history.

7. A motion estimator as claimed in claim 1, wherein computer readable instructions are further configured to generate a validity control signal to examine matches only within valid search areas.

8. A motion estimator as claimed in claim 1, wherein the computer readable instructions are further configured to allow searching for vectors which originate outside a picture being searched by an assertion of an extend image line signal for a first scan line of a search area.

9. A method of generating a motion vector for a digital image coding system comprising:
   a. generating, using a processor, shape, address, vector and variable delay control signals according to a selected size and shape of a search area comprising scan lines;
   b. storing, using the processor, a reference image of a frame in which a matching macroblock is sought;
   c. variably delaying, using an array of variable line delays, data read from the reference image, according to the variable delay control signal to align a current serial input stream of a current scan line of the search area with a serial input stream of an immediately preceding scan line, to produce aligned reference image pixel data, wherein a size of the array required is determined by a size of a macroblock being matched;
   d. receiving, using the processor, the aligned reference image pixel data and pixel data of a current macroblock for which a match is sought and a vector control signal at match computation means and producing a score representative of a quality of a match between the aligned reference image data pixels and pixels of a current macroblock defined by the received vector control signal; and
   e. recording, using the processor, a best score together with the corresponding best vector and outputting the corresponding best vector.

10. A method as claimed in claim 9, wherein the control information generated is variable from picture to picture according to image behaviour to optimise search area shape and size dependent on image criteria.

11. A method as claimed in claim 9, further comprising weighting, using the processor, luminance of the reference image so that a current macroblock is matched against a scaled version of the reference image.

12. A method as claimed in claim 9, comprising matching, using the processor, the reference image data and macroblock data using one of a sum of absolute differences and normalized cross-correlation.

13. A method as claimed in claim 9, comprising matching, using the processor, the reference image data and macroblock data every clock cycle.

14. A method as claimed in claim 9, further comprising weighting, using the processor, a score produced by matching the reference image data and macroblock data dependent on the corresponding vector.

15. A method as claimed in claim 14, comprising weighting, using the processor, the score dependent upon at least one of image properties local to the search area and previous coding history.

16. A method as claimed in claim 9, comprising generating, using the processor, a validity control signal to restrict examining matches to valid search areas.

17. A method as claimed in claim 9, wherein variably delaying data read from the reference image further comprises providing, using the processor, extend image means to permit searching by the match computation means for vectors which originate outside a picture being searched by switching all outputs of the variable delay line means directly to the input of the variable delay line means on assertion of an extend image line signal for a first scan line of a search area.

18. A tangible computer readable storage medium comprising computer readable instructions, when executed by a processor, the computer readable instructions are configured for: code being for generating a motion vector for a digital image coding system comprising:
   a. generating shape, address, vector and variable delay control signals according to a selected size and shape of a search area comprising scan lines;
   b. storing a reference image of a frame in which a matching macroblock is sought;
   c. variably delaying data read from the reference image, using an array of variable line delays, according to the variable delay control signal to align a current serial input stream of a current scan line of the search area with a serial input stream of an immediately preceding scan line, to produce aligned reference image pixel data wherein a size of the array required is determined by a size of a macroblock being matched;

d. receiving the aligned reference image pixel data and pixel data of a current macroblock for which a match is sought and a vector control signal at match computation means and producing a score representative of a quality of a match between the aligned reference image data pixels and pixels of a current macroblock defined by the received vector control signal; and e. recording a best score together with the corresponding best vector and outputting the corresponding best vector.

19. A tangible computer readable storage medium as claimed in claim 18, wherein the control information generated is variable from picture to picture according to image behaviour to optimise search area shape and size dependent on image criteria.

20. A tangible computer readable storage medium as claimed in claim 18, further comprising computer-readable instructions, when executed by the processor, are configured for weighting luminance of the reference image so that a current macroblock is matched against a scaled version of the reference image.

21. A tangible computer readable storage medium as claimed in claim 18, comprising computer-readable instructions, when executed by the processor, are configured for matching the reference image data and macroblock data using one of a sum of absolute differences and normalised cross-correlation.

22. A tangible computer readable storage medium as claimed in claim 18, comprising computer-readable instructions, when executed by the processor, are configured for matching the reference image data and macroblock data every clock cycle.

23. A tangible computer readable storage medium as claimed in claim 18, comprising computer-readable instructions, when executed by the processor, are configured for weighting a score produced by matching the reference image data and macroblock data dependent on the corresponding vector.

24. A tangible computer readable storage medium as claimed in claim 23, comprising computer-readable instructions, when executed by the processor, are configured for weighting the score dependent upon at least one of image properties local to the search area and previous coding history.

25. A tangible computer readable storage medium as claimed in claim 18, comprising computer-readable instructions, when executed by the processor, are configured for generating a validity control signal to restrict examining matches to valid search areas.

26. A tangible computer readable storage medium as claimed in claim 18, wherein the computer-readable instructions for variably delaying data read from the reference image further comprises computer-readable instructions, when executed by the processor, are configured for providing extend image means to permit searching by the match computation means for vectors which originate outside a picture being searched by switching all outputs of the variable delay line means directly to the input of the variable delay line means on assertion of an extend image line signal for a first scan line of a search area.

* * * * *

UNITED STATES PATENT AND TRADEMARK OFFICE
CERTIFICATE OF CORRECTION

PATENT NO. : 8,406,304 B2
APPLICATION NO. : 11/811230
DATED : March 26, 2013
INVENTOR(S) : Huggett Page 1 of 1

It is certified that error appears in the above-identified patent and that said Letters Patent is hereby corrected as shown below:

In the Specifications

In Column 6, Line 60, delete "size" and insert -- size. --, therefor.

In the Claims

In Column 7, Line 34, in Claim 3, delete "claim 1, further" and insert -- claim 1, --, therefor.

In Column 7, Line 39, in Claim 4, delete "wherein" and insert -- wherein the --, therefor.

In Column 7, Line 50, in Claim 7, delete "wherein" and insert -- wherein the --, therefor.

In Column 8, Line 67, in Claim 18, delete "data" and insert -- data, --, therefor.

Signed and Sealed this
Fourth Day of June, 2013

Teresa Stanek Rea
*Acting Director of the United States Patent and Trademark Office*